(12) United States Patent
Kato et al.

(10) Patent No.: US 6,980,260 B2
(45) Date of Patent: Dec. 27, 2005

(54) REFLECTION TYPE LIQUID CRYSTAL PROJECTOR

(75) Inventors: Shigeru Kato, Tochigi (JP); Hiroki Kameyama, Tochigi (JP)

(73) Assignee: Sano Fuji Koki Co., Ltd., Sano (JP)

( * ) Notice: Subject to any disclaimer, the term of this patent is extended or adjusted under 35 U.S.C. 154(b) by 61 days.

(21) Appl. No.: 10/362,451

(22) PCT Filed: Jul. 15, 2002

(86) PCT No.: PCT/JP02/07162
§ 371 (c)(1),
(2), (4) Date: Feb. 25, 2003

(87) PCT Pub. No.: WO03/007073
PCT Pub. Date: Jan. 23, 2003

(65) Prior Publication Data
US 2003/0189676 A1 Oct. 9, 2003

(30) Foreign Application Priority Data
Jul. 13, 2001 (JP) .................................. 2001-213748

(51) Int. Cl.[7] .................. G02F 1/1335; G03B 21/14
(52) U.S. Cl. .................................... 349/9; 353/31
(58) Field of Search .................... 349/8, 9, 5; 353/20, 353/31, 33, 34, 37; 359/487, 488, 495, 496

(56) References Cited

U.S. PATENT DOCUMENTS 6,176,586 B1 * 1/2001 Hirose et al. .................. 353/31

FOREIGN PATENT DOCUMENTS

| JP | 2001-154268 | 6/2001 |
| JP | 2001-154294 | 6/2001 |

* cited by examiner

Primary Examiner—Robert H. Kim
Assistant Examiner—Tai Duong
(74) Attorney, Agent, or Firm—Oblon, Spivak, McClelland, Maier & Neustadt, P.C.

(57) ABSTRACT

While illuminating light is separated into a first wavelength component illuminating light and second and third wavelength component illuminating lights by a dichroic mirror, the first illuminating light is reflected off a first liquid crystal display element to form a first wavelength component image light which is then reflected off or passed through the polarizing surface of a first polarizing beam splitter, whereas one of the second and third wavelength component illuminating lights has its polarizing surface 90°-converted by a ½ phase difference plate, the other one is passed through the plate without having its polarizing surface converted, the second and third wavelength components are separated from each other by a second polarizing beam splitter and respectively reflected off second and third liquid crystal display elements to obtain second.

7 Claims, 16 Drawing Sheets

US 6,980,260 B2

REFLECTION TYPE LIQUID CRYSTAL PROJECTOR

FIELD OF THE ART

This invention relates to a reflection type liquid crystal projector, and more particularly to an optical system for reflection type liquid crystal projector, adapted to project image light of three primary colors by splitting uniformly polarized white illuminating light rays into three RGB wavelength components, producing image light of three colors by reflecting the resulting three wavelength components respectively with liquid crystal display panels, and integrating the image light of the three colors together.

BACKGROUND OF THE ART

Optical system in existing reflection type liquid crystal projectors is basically constituted by a color separating optical system for splitting illuminating light rays from a white light source into three RGB wavelength components, three reflection type liquid crystal display panels for reflecting the separated RGB wavelength components of the illuminating light to produce image light of the respective components, and a color integrating optical system for integrating the reflected image light from the respective liquid crystal display panels into a full-color image. For example, the color separating optical system is constituted by a combination of optical elements such as dichroic mirror and polarizing beam splitters. On the other hand, the color integrating optical system can be constituted by a combination of optical elements such as polarizing beam splitter and a dichroic prism. With regard to the optical systems of this sort, various proposal have thus far been made as disclosed, for example, in Laid-Open Japanese Patent Applications 2001-92005, 2001-100155 and H11-326861.

In the case of the reflection type liquid crystal projector mentioned above, the optical system employs a polarizing beam splitter or splitters as an optical device for separating illuminating light rays into three RGB wavelength components or for separating two wavelength components of illuminating light rays after separating one wavelength component by the use of a dichroic mirror. Further, a polarizing beam splitter and a dichroic prism are also used at the time of integrating image light of RGB wavelength components which are reflected by three reflection type liquid crystal display panels.

In this connection, the polarizing beam splitter and the dichroic prism have been generally considered as an optical device or element which is suitable for transmitting p-polarization light while reflecting s-polarization light. Of course, there are optical devices or elements which are geared to reflect p-polarization light while transmitting s-polarization light. Generally, a polarizing beam splitter or a dichroic prism, which has a polarizing film or a dichroic film of multiple layer construction, needs to have a more than two times greater number of layers to function as an optical element which reflects p-polarization light and transmits s-polarization light, as compared with a polarizing beam splitter or dichroic prism which is designed to transmit p-polarization light and reflect s-polarization light. Naturally, the greater the number of layers, the higher becomes the cost as an optical element. Nevertheless, in the optical arrangement according to the above-mentioned prior art, a polarizing beam splitter and a dichroic prism are partly used for reflection of p-polarization light and transmission of s-polarization light despite a great advantage that they make the whole optical system extremely expensive.

Of the above-mentioned prior art publications, Laid-Open Japanese Patent Application H11-326861 discloses a reflection type liquid crystal projector which is arranged to split illuminating light in the state of s-polarization light, firstly separating a green wavelength component of the illuminating light from blue and red wavelength components by the use of a dichroic mirror, and then passing the blue and red wavelength components through a half wave plate thereby to convert the red wavelength component to p-polarization light by rotating the plane of polarization by 90 degrees. The green wavelength component of the illuminating light, which is still in the state of s-polarized light, is reflected by one polarizing beam splitter toward a liquid crystal display panel. The p-polarized red component of the illuminating light and the s-polarized blue component of the illuminating light are separated by another polarizing beam splitter, which permits the p-polarized red component to pass through a polarizing surface while reflecting the s-polarized blue component by the polarizing surface. The separated red and blue components of the illuminating light are directed toward the respective liquid crystal display panels. Accordingly, one of the polarizing beam splitters in the optical system is required to reflect s-polarization light and transmit p-polarization light.

In the case of the optical system which is disclosed in Laid-Open Japanese Patent Application H11-326861, a dichroic prism is used in ultimately integrating image light of three wavelength components together. This dichroic prism needs to have characteristics of transmitting image light of p-polarized green wavelength component while reflecting image light of s-polarized red wavelength component and p-polarized blue wavelength component.

In this regard, it is important to note that transmission characteristics or transmittivity of the dichroic prism vary conspicuously depending upon the angle of incidence of input light. Normally, a reflection type liquid crystal projector is provided with a converging lens in its light source, so that a light flux from the light source is converged toward a dichroic prism to enter the latter with a certain angle of incidence. In a case where image light of the green wavelength component is transmitted through the dichroic prism as p-polarization light and image light of the red wavelength component is reflected by the dichroic prism as p-polarization light as in the above-described prior art, a conspicuous drop in transmittivity of image light of one wavelength component can occur in connection with its angle of incidence to invite degradations in image light output efficiency. This phenomenon makes it necessary to minimize the angle of incidence on the dichroic prism by using a less bright converging lens with a larger f value, although it will again lead to the problem of degradations in image light output efficiency.

DISCLOSURE OF THE INVENTION

In view of the foregoing situations, it is an object of the present invention to provide an optical system for a reflection type liquid crystal projector, which is capable of producing bright and high-quality color images by the use of an optical system of simplified in construction.

In order to achieve the above-stated objective, according to the present invention, there is provided an optical system for a reflection type liquid crystal projector arranged to split a beam of uniformly polarized white illuminating light, which is projected from a light source, into first, second and third wavelength components of three primary colors, to reflect said three wavelength components respectively by means of liquid crystal display panels to produce image light of the first, second and third wavelength components, and to integrate the image light of the wavelength components together for projecting a full-color image: an optical system which comprises: a dichroic mirror adapted to separate a first wavelength component of the white illuminating light from second and third wavelength components; a first polarizing beam splitter having a polarizing surface adapted to transmit or reflect the first wavelength component of the illuminating light toward a first liquid crystal display panel thereby to reflect image light of the first wavelength component; a half-wave plate adapted to rotate plane of polarization of one of the second and third wavelength components through 90 degrees on passage therethrough, without rotating plane of polarization of the other wavelength component; a second polarizing beam splitter having a polarizing surface adapted to reflect or transmit the second wavelength component of the illuminating light from the half-wave plate toward a second liquid crystal display panel thereby to reflect image light of the second wavelength component, while transmitting or reflecting the third wavelength component of the illuminating light toward a third liquid crystal display panel thereby to reflect image light of the third wavelength component of the illuminating light; and a dichroic prism for integrating together image light of the first to third wavelength components coming in from the first and second polarizing beam splitters; the polarizing surfaces of the first and second polarizing beam splitters being adapted to reflect s-polarization light and transmit p-polarization light; and the dichroic prism being adapted to transmit image light of the second wavelength component in the state of p-polarization light and to reflect image light of the first and third wavelength components each in the state of s-polarization light.

Namely, the reflection type liquid crystal projector according to the present invention is basically constituted by a dichroic mirror, a couple of polarizing beam splitters, a half-wave plate and a dichroic prism. In this instance, of the three wavelength components, for example, if the first wavelength component is a blue component, the second wavelength component is a green component and the third wavelength component is a red component. Alternatively, if the first wavelength component is a red component, the second wavelength component is a green component and the third wavelength component is a blue component. That is to say, the first, second and third wavelength components are in the order either from the shorter to longer side or from the longer to shorter side in wavelength. The dichroic mirror functions to separate the first wavelength component from the second and third wavelength components. At the half-wave plate, the wavelength component to be reflected by the second polarizing beam splitter is converted into s-polarization light, and the wavelength component to be transmitted through the second polarizing beam splitter is converted into p-polarization light.

At the dichroic prism, arrangements are made to suppress to the minimum variations in transmittivity and reflectivity which would normally occur depending upon the angle of incidence of input light. In this regard, the optical system employs a dichroic prism which has characteristics of reflecting a blue wavelength component in the state of s-polarization light or characteristics of reflecting a red wavelength component in the state of s-polarization light. In a case where the blue component is to be reflected, the red wavelength component can be transmitted approximately 100% if in the state of s-polarization light. On the contrary, in a case where the red component is to be reflected, the blue wavelength component can be transmitted approximately 100% if in the state of s-polarization light. On the other hand, with regard to the green wavelength component, even if it is angularly incident on the prism, 100% transmittivity or nearly 100% transmittivity can be obtained as long as it is p-polarization light. However, if the green wavelength component is in the state of s-polarization light, the transmittivity varies largely depending upon the angle of incidence. Therefore, the second wavelength component, that is, the green wavelength component is directed to the dichroic prism as p-polarization light from the second polarizing beam splitter to secure high transmittivity uninfluenced by the angle of incidence. Further, at the dichroic prism, one of the blue and red wavelength components which are both in the state of s-polarization light is reflected by a dichroic surface and the other one is transmitted through. As a consequence, it becomes possible to prevent degradations in transmittivity (reflectivity) even when the angle of incidence is increased. In other words, it becomes possible for the light source to employ a bright lens with a small f value as a converging lens.

Illuminating light may be either p-polarization light or s-polarization light as long as it is uniformly polarized. However, it is most desirable for the dichroic prism to reflect the first wavelength component in the state of s-polarization light. For this purpose, it is desirable for the illuminating light to be p-polarization light. In case the illuminating light is s-polarization light, however, a half-wave plate can be located in front of the first polarizing beam splitter thereby to rotate the plane of polarization of the illuminating light through 90 degrees for conversion into p-polarization light.

The half-wave plate can be provided independently in the form of a film which is coated on a plate with flat parallel surfaces. However, it is preferable to coat a retarder film on a light incident surface of the second polarizing beam splitter. Further, the first and second polarizing beam splitters and the dichroic prism can be provided as separate optical elements, but it is preferable to integrate these optical elements into a single complex structure, eliminating boundary surfaces in the light paths to the dichroic prism from the first and second polarizing beam splitters.

BEST MODE FOR CARRYING OUT THE INVENTION

Figure 1:
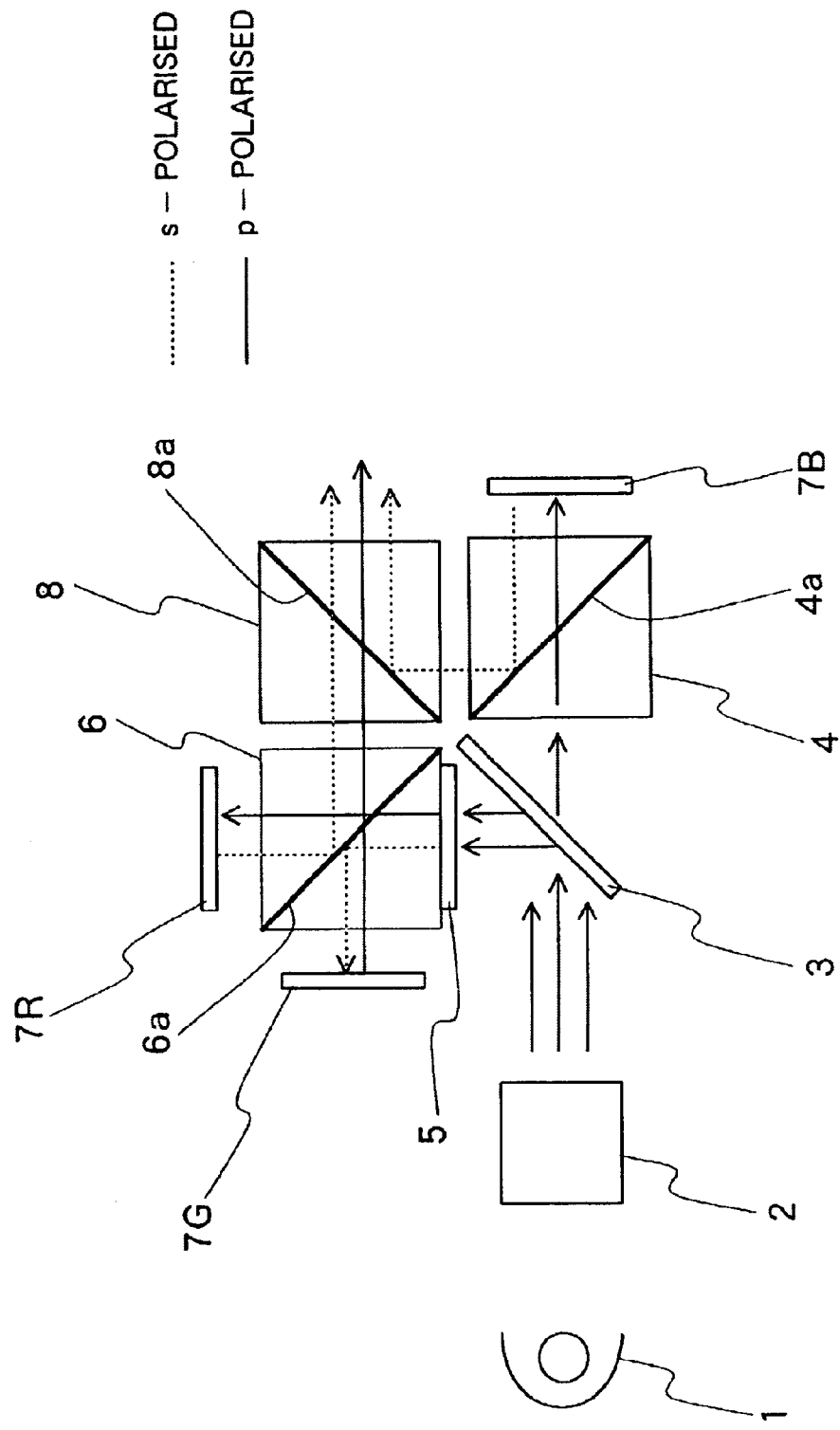
FIG. 1 is a schematic illustration showing general layout of an optical arrangement adopted as a first embodiment by the reflection type liquid crystal projector according to the present invention.

Referring to FIG. 1, there is shown a first embodiment of the present invention, in which indicated at 1 is a white light source and at 2 a polarization converting means, which constitutes an illuminating light source section along with the white light source 1. The polarization converting means 2 functions to regulate the plane of polarization of illuminating light rays from the white light source 1. In the case of the particular embodiment shown, illuminating light is regulated into p-polarized light by the polarization converting means 2.

Indicated at 3 is a dichroic mirror to which illuminating light is fed in the first place. This dichroic mirror 3 serves to separate a first illuminating light component or a blue wavelength component (hereinafter referred to simply as "B component" for brevity) from a second illuminating light component or a green wavelength component (hereinafter referred to simply as "G component" for brevity) and a third illuminating light component or a red wavelength component (hereinafter referred to simply as "R component" for brevity). Namely, the dichroic mirror 3 functions to transmit B component through while reflecting G and R components of the illuminating light.

Denoted at 4 is a polarizing beam splitter (hereinafter referred to simply as "the first PBS" for brevity). The B component of the illuminating light which has been transmitted through the dichroic mirror 3 as p-polarization light is transmitted through a polarizing surface 4a of the first PBS 4. Located in a transmitted light path from the first PBS 4 is a reflection type liquid crystal display panel 7B (hereinafter referred to simply as "B-LCD" for brevity) for reflecting blue image light. Accordingly, the B component of the illuminating light is reflected by B-LCD 7B to produce image light of the blue wavelength component (hereinafter referred to simply as "B image light" for brevity). From B-LCD 7B, B image light is reflected as s-polarization light. This B image light is reflected by polarizing surface 4a of the first PBS 4 and as a result its light path is bent through 90 degrees.

Indicated at 5 is a half wave plate (hereinafter referred to simply as "wave plate" for brevity). Of the G and R components of the illuminating light which are reflected from the dichroic mirror 3, the half wave plate 5 rotates the plane of polarization of the G component through 90 degrees and transmits same as s-polarization light while transmitting the R component on as p-polarization light without rotating its plane of polarization.

Indicated at 6 is a second polarizing beam splitter (hereinafter referred to simply as "the second PBS" for brevity). Of G and R components of the illuminating light which have been passed through the wave plate 5 as s-polarization light and p-polarization light, respectively, the G component of the illuminating light is reflected by a polarizing surface 6a of the second PBS 6, while the R component of the illuminating light is allowed to pass through. As a result, the G and R components of the illuminating light are separated from each other. Located in a light path of the reflected G component is a reflection type liquid crystal display panel for green image light 7G (hereinafter referred to simply as "G-LCD 7G" for brevity) thereby to reflect image light of the green wavelength component (hereinafter referred to simply as "G image light" for brevity). The G component, which is in the state of s-polarization light, is reflected as p-polarization light by G-LCD 7G. On the other hand, the R component, which is p-polarization light, is transmitted through the polarizing surface 6a of the second PBS 6 and reflected by a reflection type liquid crystal display panel R-LCD 7R for red image light (hereinafter referred to simply as "R-LCD" for brevity) thereby to reflect image light of the red wavelength component (hereinafter referred to simply as "R image light" for brevity). The R component is in the state of p-polarization light, so that the R image light is reflected from R-LCD 7R as s-polarization light. Further, the G image light is transmitted through the polarizing surface 6a of the second PBS 6, while the R image light is reflected by the polarizing surface 6a of the second PBS 6. As a consequence, the G image light and the R image light are integrated together.

Denoted at 8 is a dichroic prism, which serves to output a full-color image by integrating the B image light which has been reflected by the polarizing surface 4a of the first PBS 4, with the G image light and the R image light which have been integrated together by the second PBS 6. The dichroic prism 8 is provided with dichroic film 8a with optical characteristics of reflecting the B image light while transmitting through the G image light and the R image light. Thus, obtained at the output of the dichroic prism is an integrated color image consisting of the three primary colors R, G and B.

Figure 2:
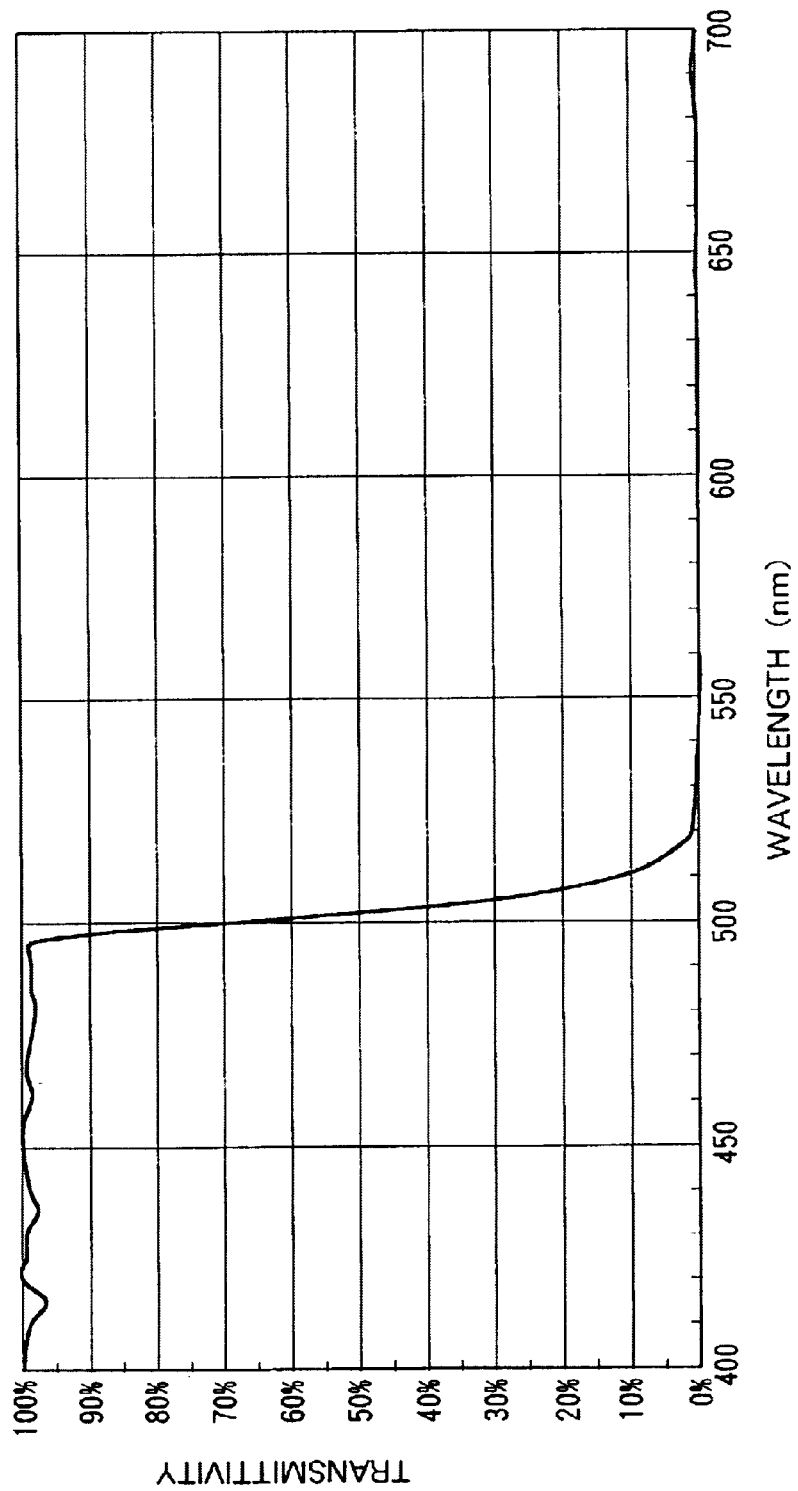
FIG. 2 is a transmission characteristics diagram of a dichroic mirror.
Figure 3:
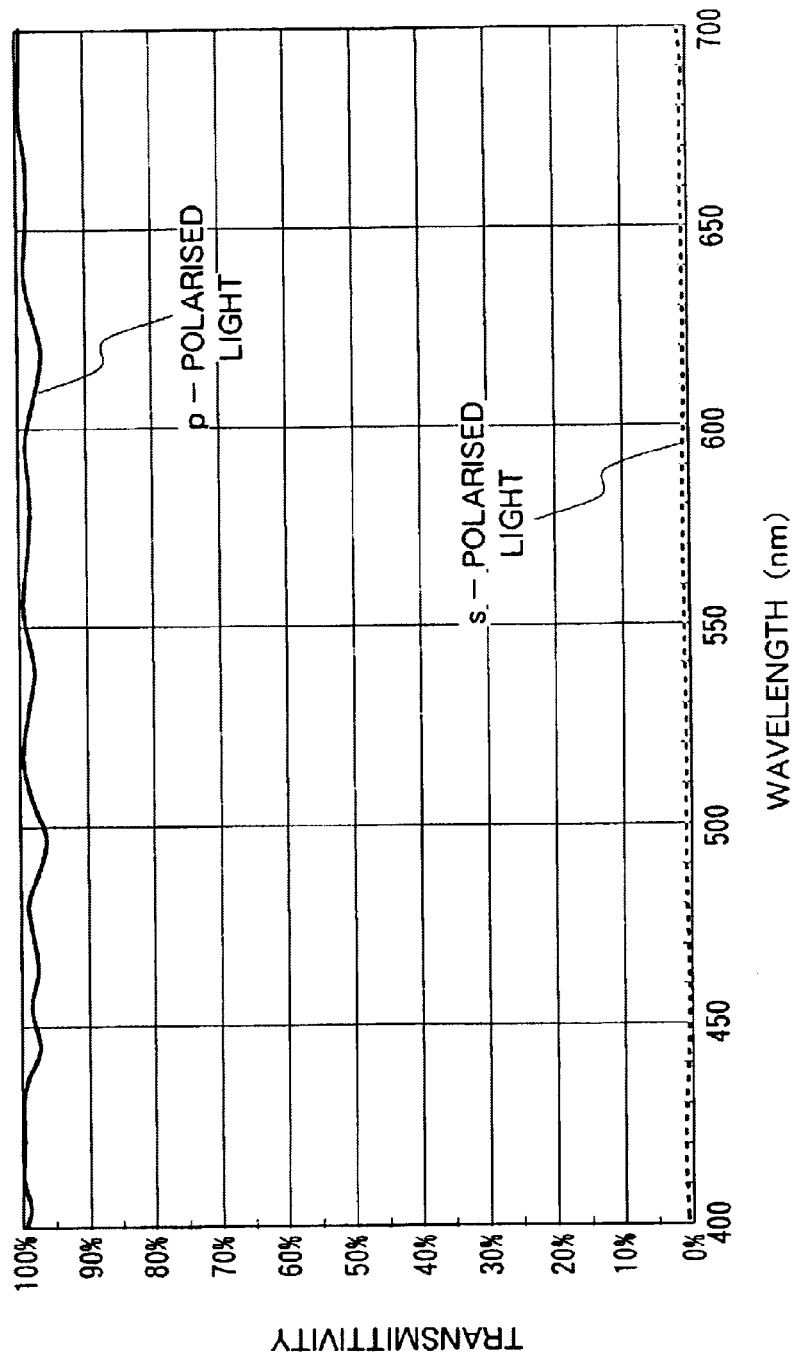
FIG. 3 is a transmission characteristics diagram of a polarizing beam splitter.
Figure 4:
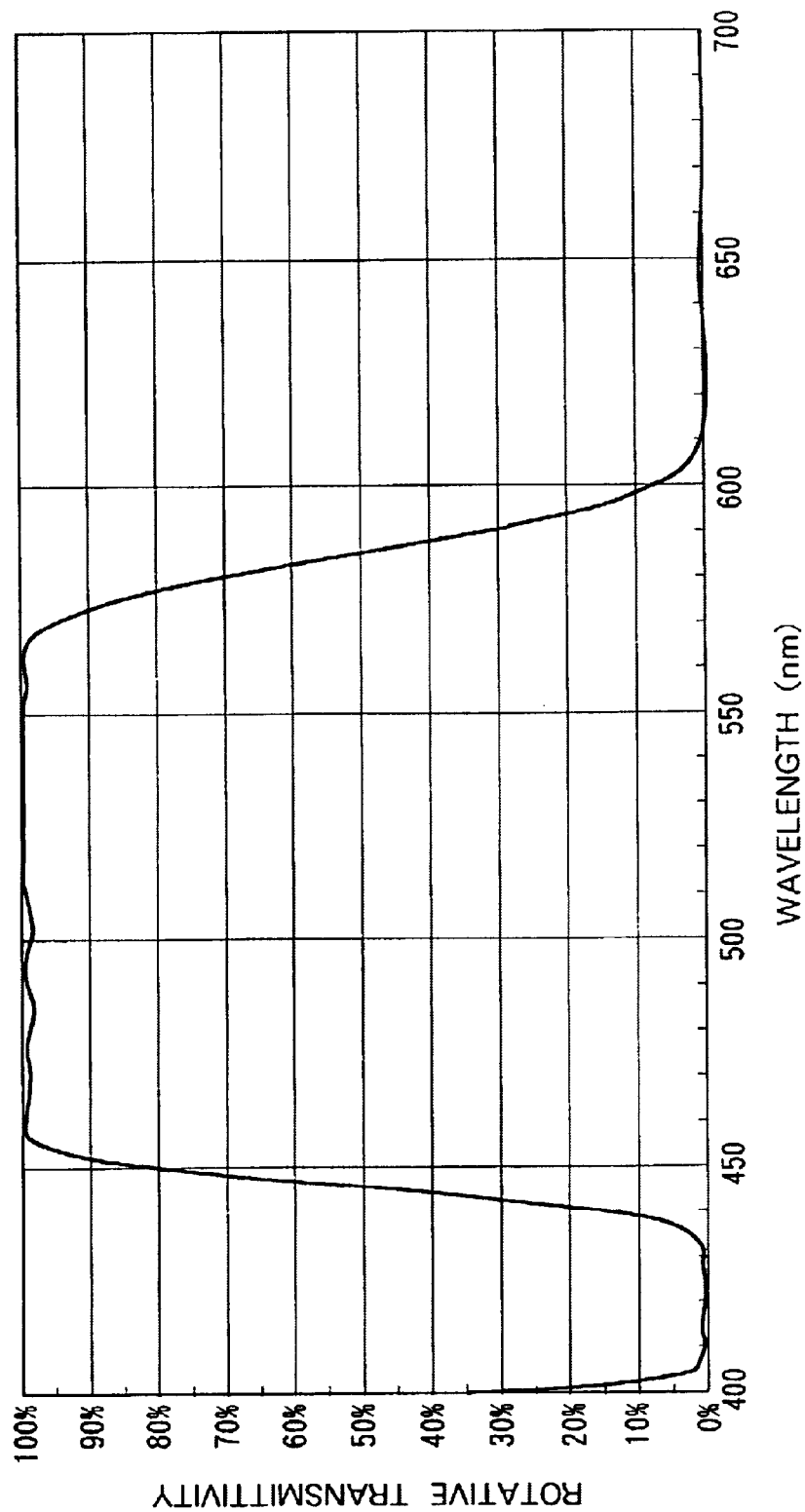
FIG. 4 is a rotative transmission characteristics diagram of a half wave plate.

Shown in FIG. 2 is a diagram of spectral characteristics of the dichroic mirror 3. As clear therefrom, the dichroic mirror 3 has characteristics of virtually totally transmitting wavelengths smaller than approximately 500 nm while virtually totally reflecting wavelengths larger than 500 nm. As a consequence, the B component of shorter wavelength can be separated from the G component of the intermediate wavelength as well as from the R component of longer wavelength. With regard to optical characteristics of the first PBS 4 and the second PBS 6, p-polarization light is almost totally transmitted through as indicated by a solid line in FIG. 3, while s-polarization light is almost totally reflected as indicated by a broken line. Further, shown in FIG. 4 is a diagram of rotative transmission characteristics of the wave plate 5 with respect to G illuminating light. As clear from that figure, rotative transmission by the wave plate is approximately 100% in a wavelength range between 450 nm and 570 nm, and almost 100% of the G component which is incident on the wave plate 5 as p-polarization light is converted into s-polarization light upon transmission. The R component of larger wavelength is transmitted through without rotating the plane of polarization. In the particular example shown, the wave plate 5 is arranged to have the rotative transmission characteristics in a narrow wavelength range. However, the wave plate 5 can be arranged in a different way as long as it can convert the G component to s-polarization light and transmit the R component of p-polarization light as it is.

Figure 5:
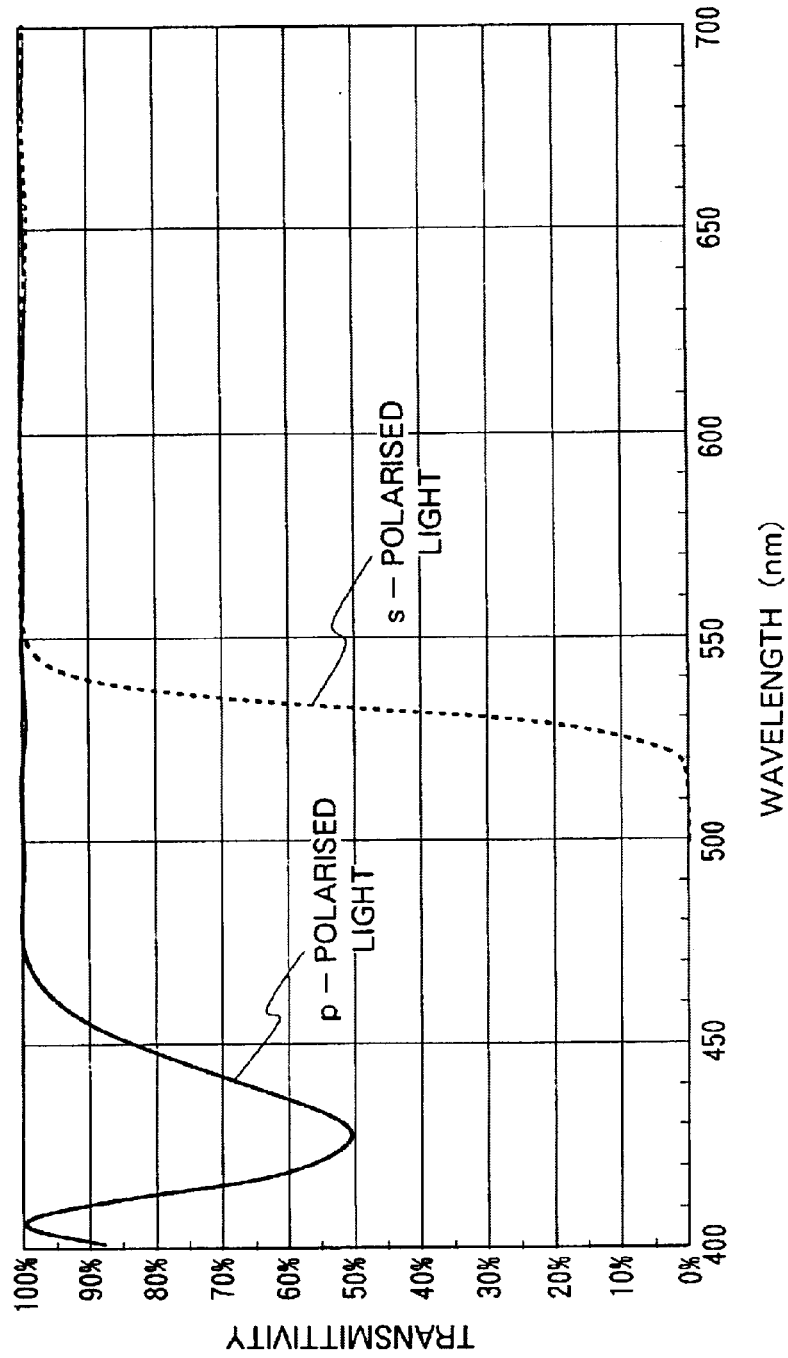
FIG. 5 is a transmission characteristics diagram of a dichroic prism.

The B image light in s-polarization as well as the G image light in p-polarization and the R image light in s-polarization are fed to the dichroic prism 8. Of the incident image light, the B image light is reflected by the surface of dichroic film 8a, while the G image light and the R image light is transmitted through the dichroic film 8a. Therefore, the dichroic prism 8 has transmission characteristics as shown in the diagram of FIG. 5. More specifically, in the diagram of FIG. 5, solid line indicates transmission characteristics with respect to p-polarization light and broken line indicates transmission characteristics with respect to s-polarization light. As clear from this figure, the transmission characteristics for p-polarization light is not stable up to a wavelength of approximately 470 nm, but the transmission is almost at the level of 100% at wavelengths larger than 470 nm. On the other hand, s-polarization light is substantially totally reflected up to a wavelength of approximately 520 nm, and substantially totally transmitted at larger wavelengths. By the blue reflecting type dichroic prism 8 with the characteristics just mentioned, the B image light of s-polarization is substantially totally reflected, and the G image light of p-polarization as well as the R image light of s-polarization is substantially totally transmitted.

Although omitted in the drawings, a converging lens is provided in the light source section. Therefore, a light flux from the light source is converged and diverged at certain points. Accordingly, a light beam which is projected from the light source has a certain angle range. In a case where the f value of the lens is minimized for the sake of brightness, the projected light beam becomes to have a greater angle range, for example, to have an angle range of approximately ±15 degrees. Generally speaking, the transmission and characteristics of dichroic layers change depending upon the angle of incident light. In the case of a liquid crystal projector, the optical system is required to have capability of maximum transmission and reflection to reduce light losses and to output brighter images.

Figure 6:
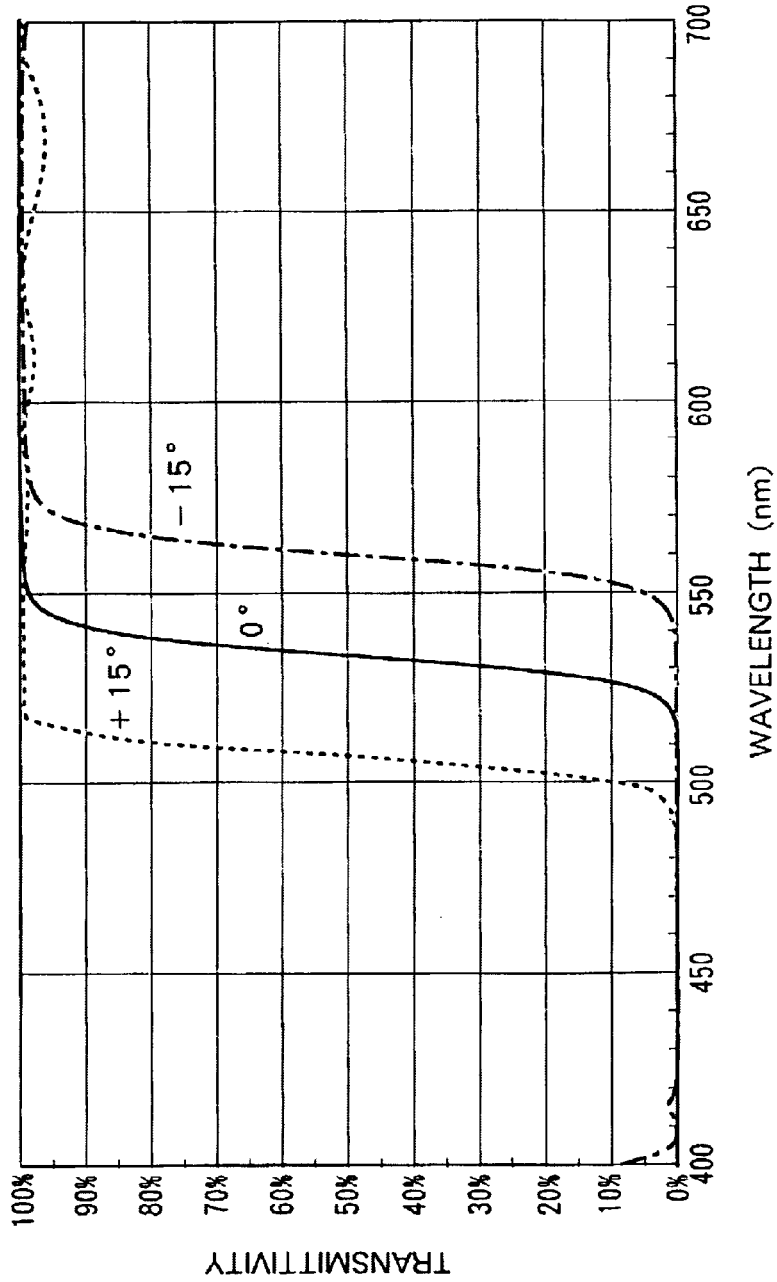
FIG. 6 is a diagram of angular transmission characteristics with respect to s-polarized light incident on a dichroic prism suited for reflecting the blue wavelength component.
Figure 7:
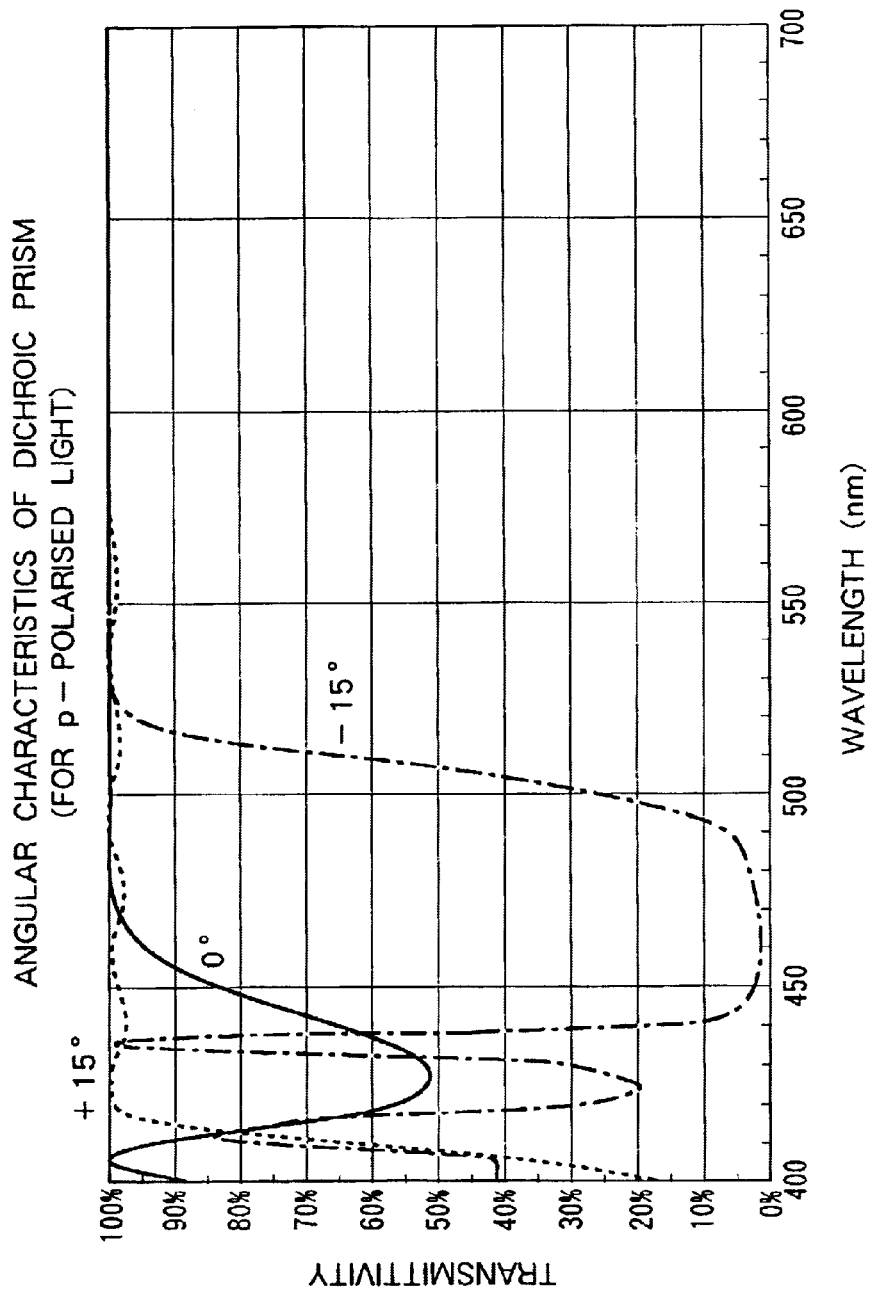
FIG. 7 is a diagram of angular transmission characteristics with respect to p-polarized light incident on a dichroic prism suited for reflecting the blue wavelength component.

In the particular embodiment shown, the dichroic prism 8 is employed for reflecting the B image light of s-polarization while transmitting the G image light of p-polarization and the R image light of s-polarization. Therefore, the dichroic prism 8 should be of the nature which is suited for reflecting light of wavelengths on the shorter side of the spectral range. Shown in FIGS. 6 and 7 are angular characteristics of the dichroic prism of this type. More specifically, shown in FIGS. 6 and 7 are angular characteristics for s-polarization light and p-polarization light, respectively. In these figures, a solid line indicates transmission characteristics at the time when the angle of incidence of input light is 0 degree, a broken line indicates transmission characteristics at the time when the angle of incidence is +15 degrees, and a one-dot chain line indicates transmission characteristics at the time when the angle of incidence is −15 degrees. Accordingly, in the case of FIG. 6, the transmittivity varies depending upon the angle of incidence in an intermediate wavelength range between 500 nm and 560 nm, but the input light is substantially totally reflected at wavelengths on the shorter and substantially totally transmitted at wavelengths on the longer side. On the other hand, in the case of FIG. 7, the transmittivity varies largely depending upon the angle of incidence on the side of short wavelengths, but transmittivity of almost 100% can be obtained in the intermediate wavelength range and on the side of longer wavelengths.

Figure 8:
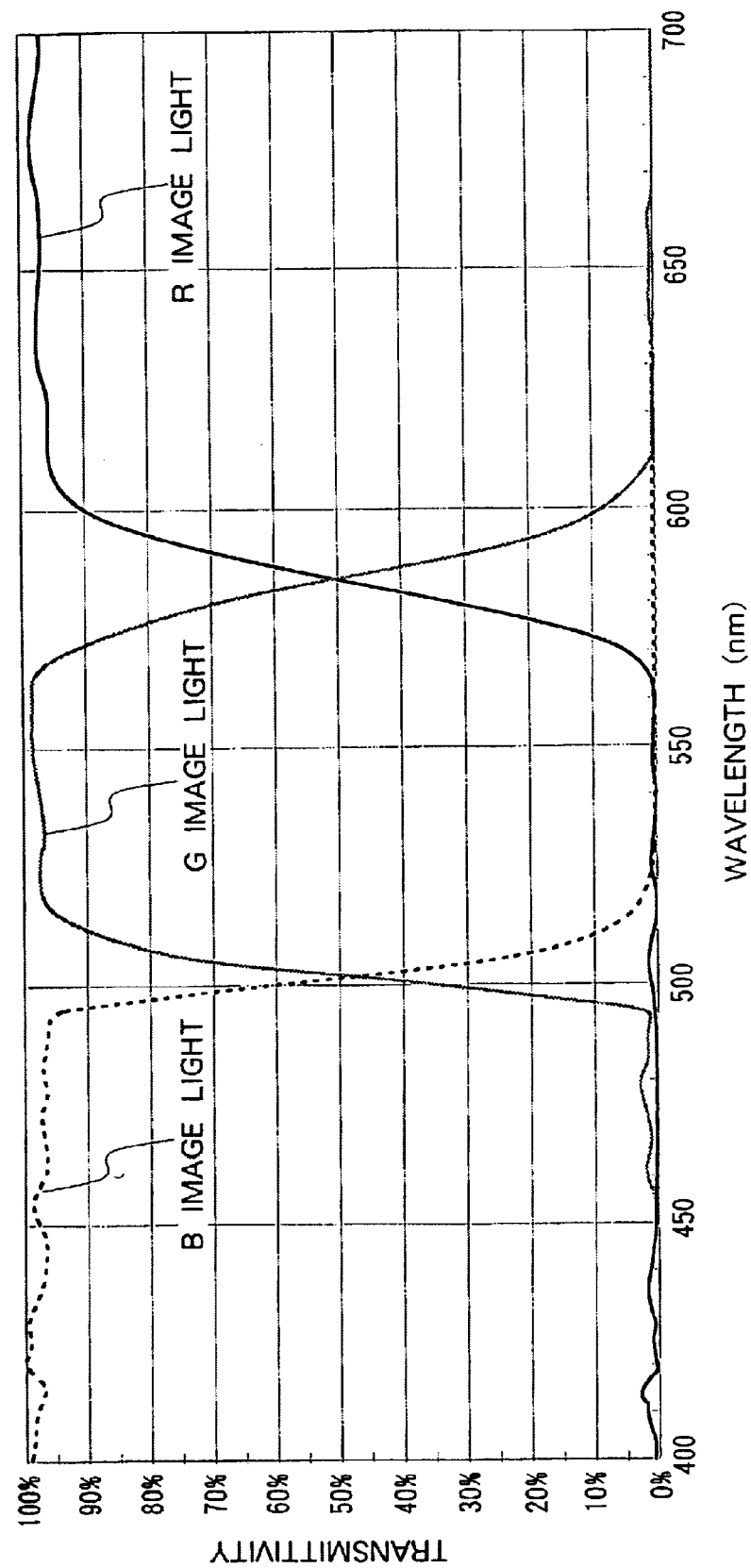
FIG. 8 is an output characteristics diagram of the dichroic prism with respect to each image light.

As described above, the dichroic prism 8 functions to reflect the B image light of s-polarization while transmitting therethrough the G image light of p-polarization as well as the R image light of s-polarization. Therefore, the dichroic prism 8 is completely free from factors which would bring about degradations in transmittivity in relation with the angle of incidence of input light, and, even in a case where a bright lens with a small f value is employed as the converging lens, output characteristics of extremely high efficiency can be obtained as shown in FIG. 8 by integrating image of three primary colors through the dichroic prism 8.

As shown in FIG. 1, the reflection type liquid crystal projector according to the present invention is simple in optical arrangement, and constituted by a reduced number of optical elements including a dichroic mirror 3, half wave plate 5, a couple of polarizing beam splitters 4 and 6 and dichroic prism 8. The simplified construction has an advantage that it becomes easier to align the optical axes of the respective optical elements. Besides, both of the polarizing beam splitters 4 and 6, which function to reflect s-polarization light and transmit p-polarization light, are simplified in polarizing film construction and can be fabricated at a lower cost. Moreover, the dichroic prism 8 which function to integrate image light of three primary colors has a conspicuous advantage that it is free from degradations in transmittivity dependent on the angle of incidence of input light.

Figure 9:
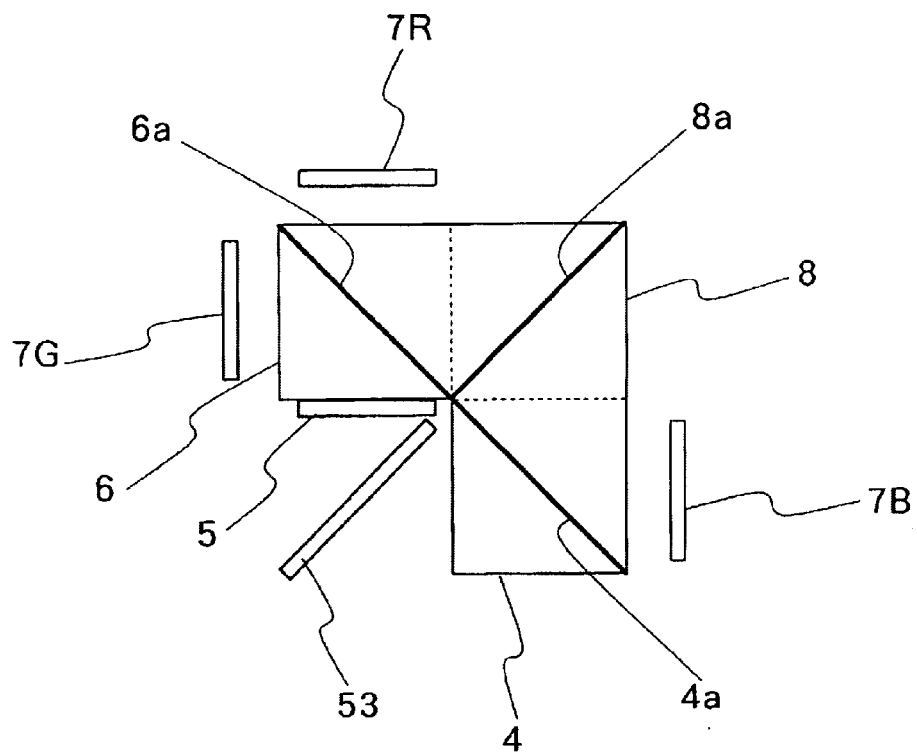
FIG. 9 is a schematic illustration of a modification of the optical arrangements shown in FIG. 1.
Figure 10:
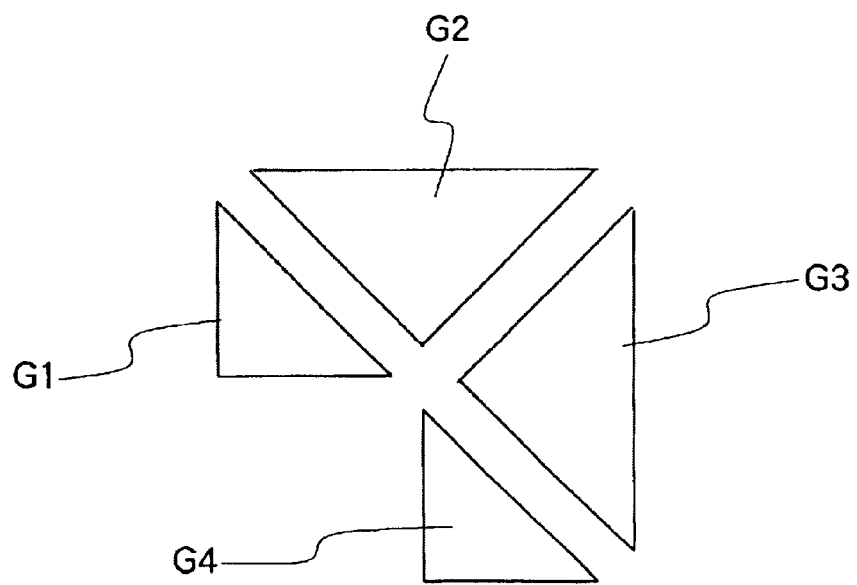
FIG. 10 is a schematic illustration showing optical glass member of FIG. 9 in a separated state.

In this instance, the half wave plate 5 can be provided as an optical element separate from the polarizing beam splitter 6 if desired. However, it is desirable to form a wave plate film integrally on the light incident surface of the polarizing beam splitter 6 as shown in the drawing. Further, the first and second PBSs 4 and 6 can be provided as one optical assembly as shown in FIGS. 9 and 10. Namely, these optical elements can be integrated into a single optical unit by bonding four optical glass elements G1 to G4 together as shown in FIG. 10, forming dichroic or polarizing film layers on necessary surfaces. In the case of a single optical unit of this sort, it becomes possible to eliminate interfacial boundaries between the output surfaces of the first and second PBSs and the input surfaces of the dichroic prism 8. Besides, the single optical unit has further advantages because it becomes unnecessary to make adjustments for alignment of the respective optical elements or to provide anti-reflection films on boundary surfaces.

Figure 11:
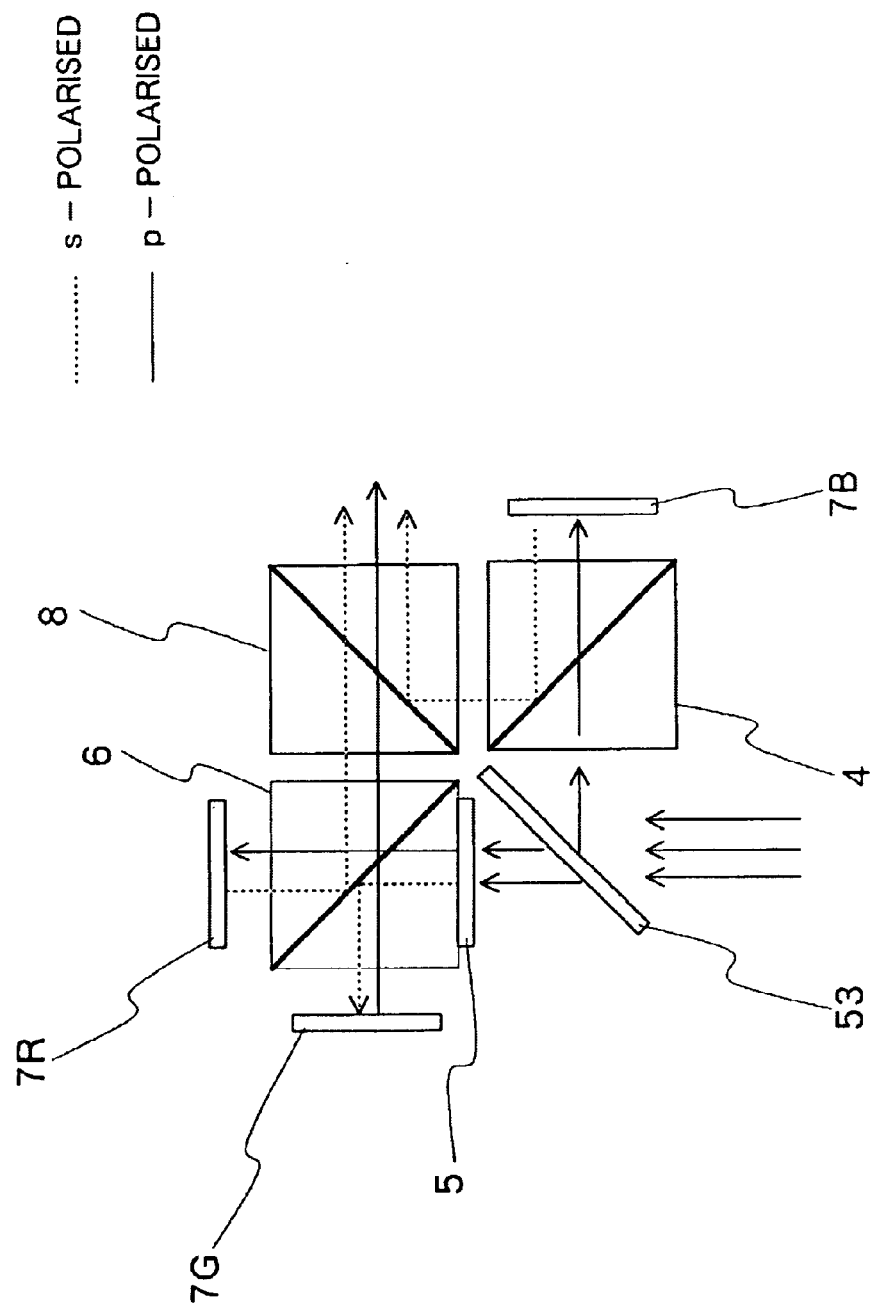
FIG. 11 is a schematic illustration showing general layout of an optical arrangement adopted as a second embodiment by the reflection type liquid crystal projector according to the present invention.

The optical system for reflection type liquid crystal projector according to the present invention can be provided in various forms, other than the one shown in FIG. 1. Some examples of other arrangements are shown in FIGS. 11 to 15. Firstly, in the case of an optical system shown in FIG. 11, illuminating light is projected from a light source in a different direction as compared with the optical arrangement shown in FIG. 1. In the case of FIG. 11, of incident illuminating light of p-polarization, a B illuminating light component is reflected by a dichroic mirror 53, while G and R illuminating light components are transmitted through the dichroic mirror 53. Except for the dichroic mirror 53, other optical arrangements are same as in FIG. 1.

Figure 12:
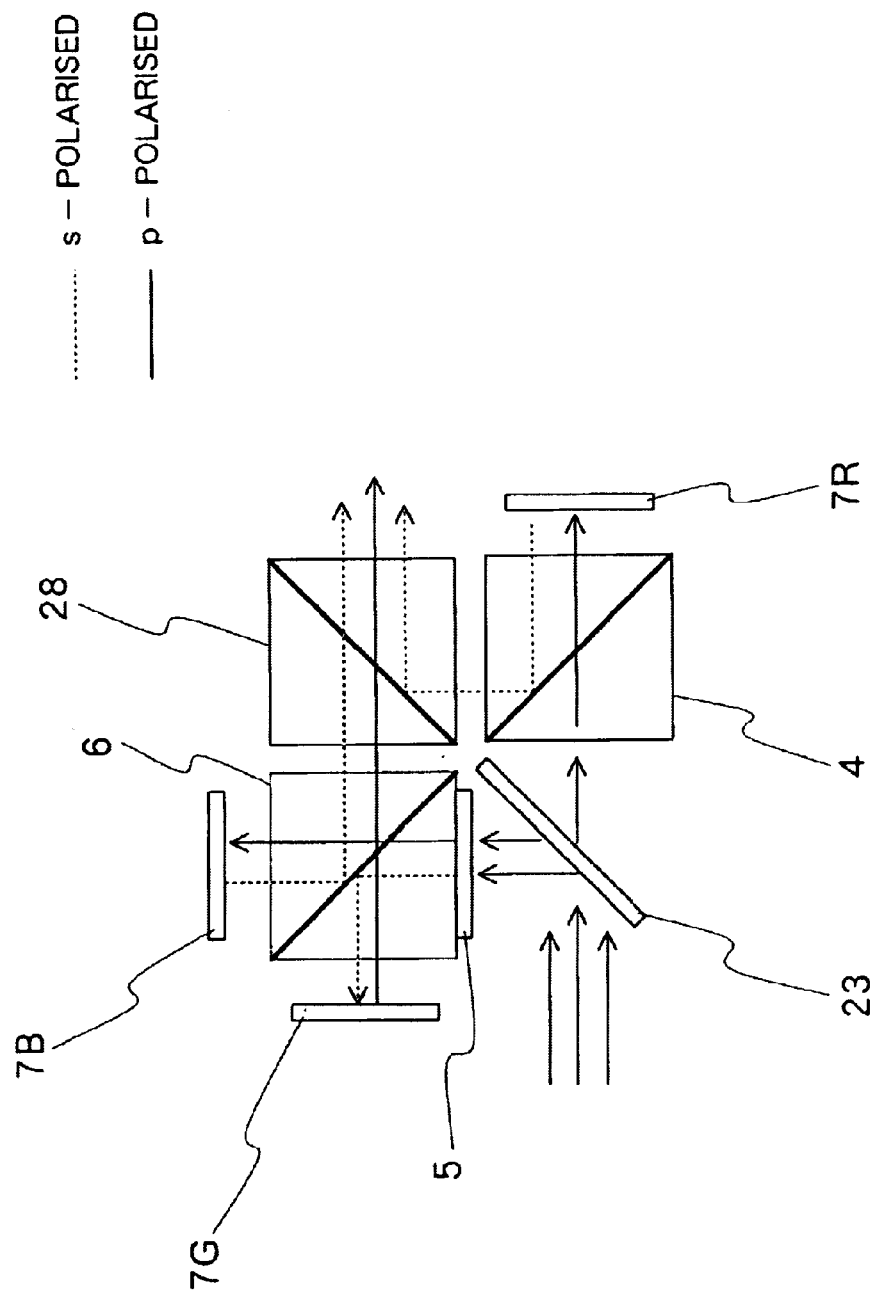
FIG. 12 is a schematic illustration of a third embodiment adopted by the reflection type liquid crystal projector according to the present invention.
Figure 16:
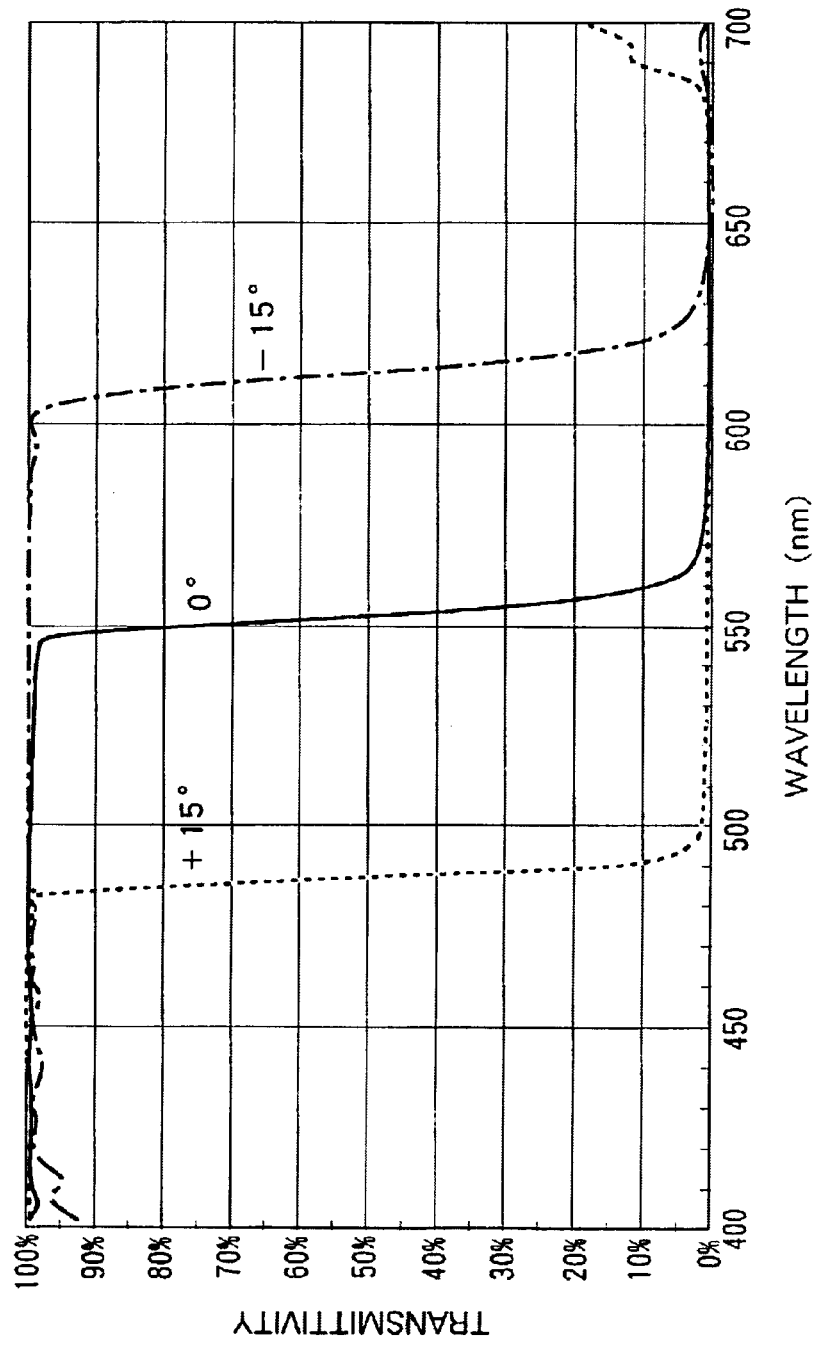
FIG. 16 is a diagram of angular transmission characteristics with respect to s-polarized light incident on a dichroic prism suited for reflecting the red wavelength component.
Figure 17:
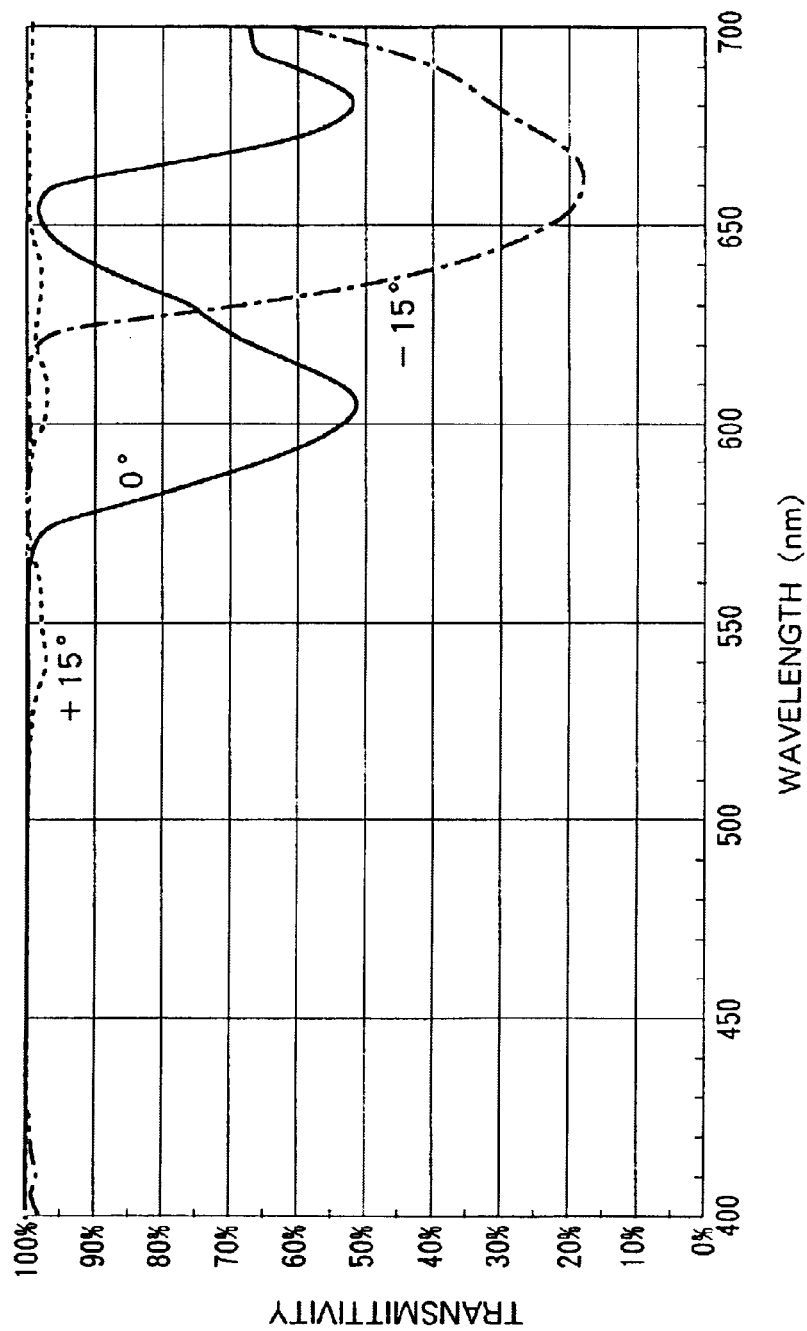
FIG. 17 is a diagram of angular transmission characteristics with respect to p-polarized light incident on a dichroic prism suited for reflecting the red wavelength component.

In the case of an optical system shown in FIG. 12, the optical system is arranged to reflect G and B illuminating light components by a dichroic mirror 23 while transmitting an R illuminating light component through the dichroic mirror 23. Accordingly, in this case, R-LCD 7R is located on the side of the first PBS 4, and B-LCD 7B is located on the side of the second PBS 6. In any case, the same optical elements as in FIG. 1 can be employed, because the first and second PBSs 4 and 6 have characteristics of reflecting s-polarization light while transmitting p-polarization light and the wave plate 5 functions to rotate the plane of polarization of the G illuminating light through 90 degrees. However, the dichroic prism 28 is required to reflect the R image light of s-polarization while transmitting the G image light of p-polarization and the B image light of s-polarization. Therefore, the dichroic prism 28 is adapted to have optical characteristics as shown in FIGS. 16 and 17. More specifically, with regard to the transmission characteristics for s-polarization light shown in FIG. 16, it is arranged to have high transmittivity on the side of short wavelengths and high reflectivity on the side of long wavelengths to preclude the adverse effects of the angle of incidence of input light. With regard to the transmission characteristics for p-polarization light shown in FIG. 17, it has approximately 100% transmittivity in short and intermediate wavelength ranges without influenced by the angle of incidence of input light.

Figure 13:
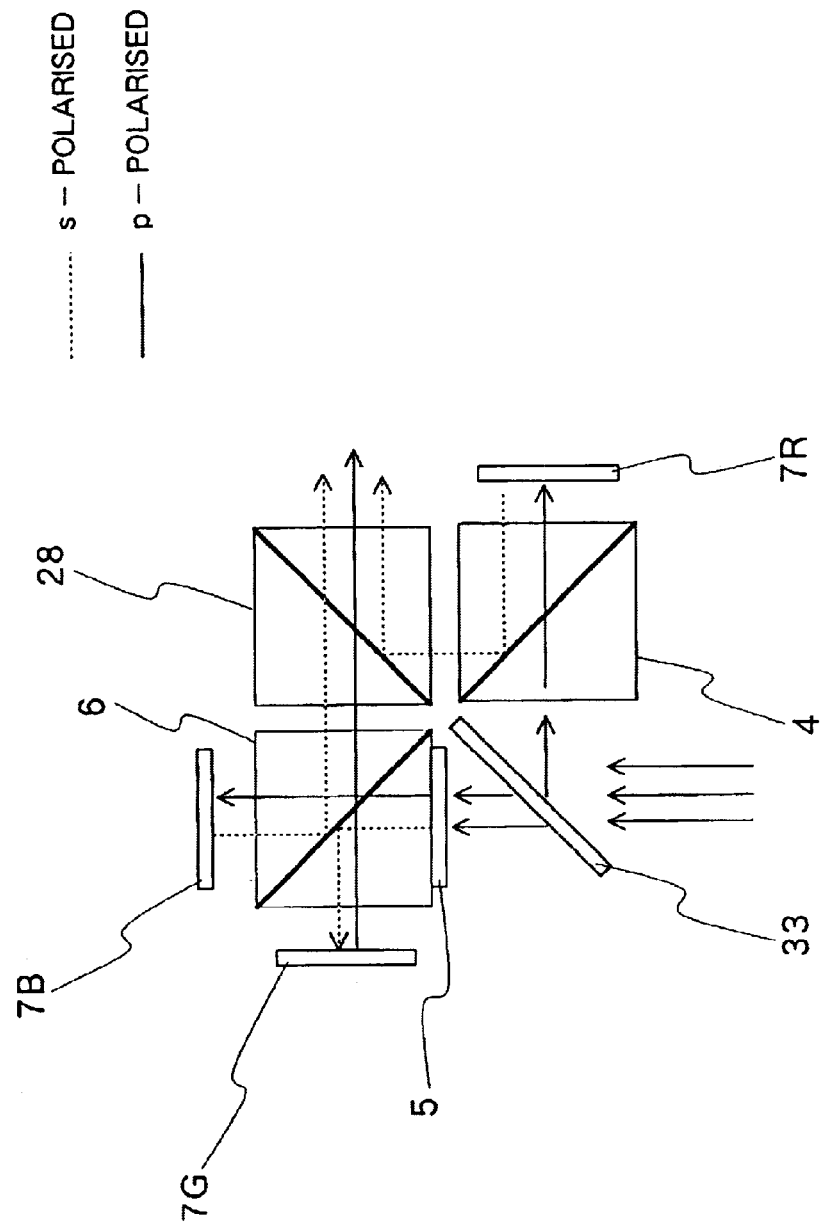
FIG. 13 is a schematic illustration of a fourth embodiment adopted by the reflection type liquid crystal projector according to the present invention.

Further, in the case of an optical system shown in FIG. 13, same optical arrangements as in FIG. 12 are employed except for the use of a dichroic mirror 33 with optical characteristics of reflecting the R illuminating light component while transmitting the G and B illuminating light components.

Figure 14:
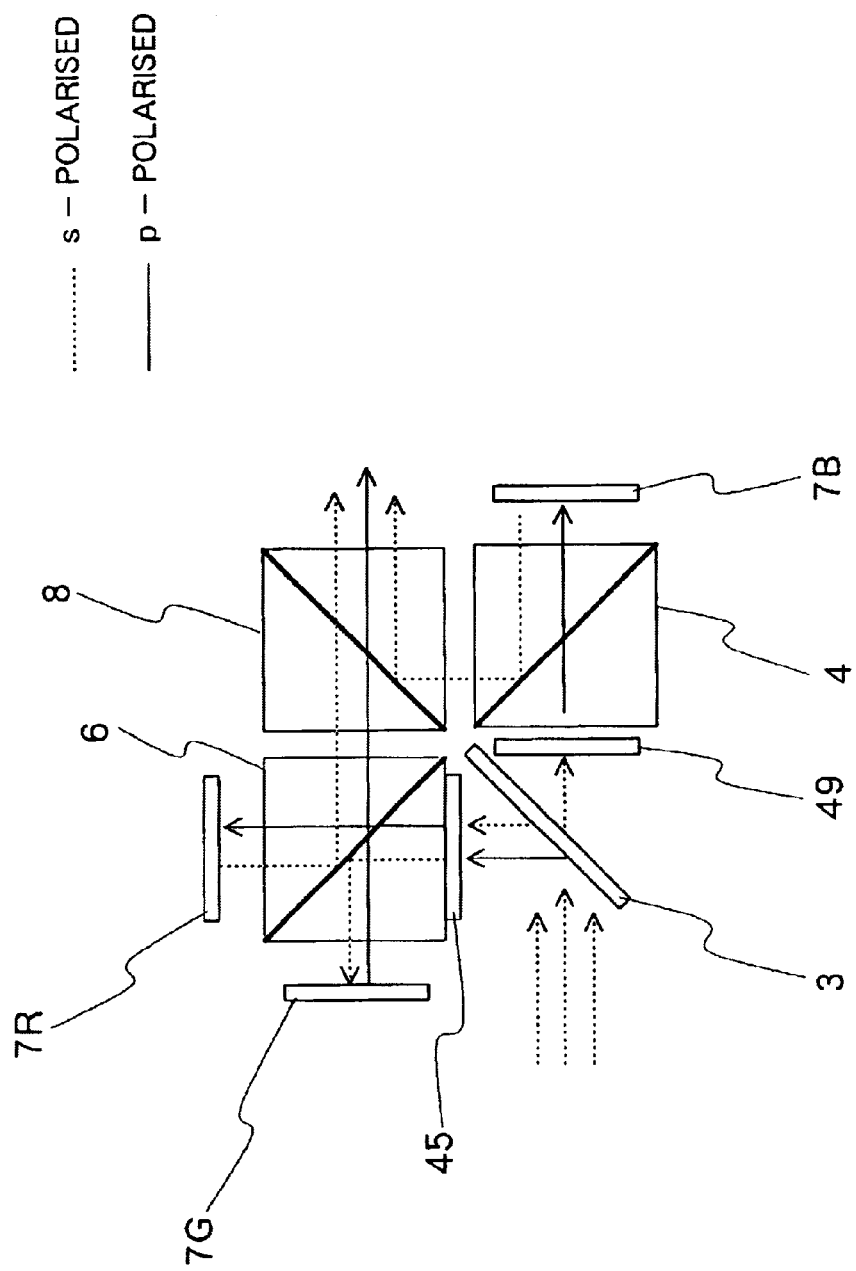
FIG. 14 is a schematic illustration of a fifth embodiment adopted by the reflection type liquid crystal projector according to the present invention.

Furthermore, in the case of an optical system shown in FIG. 14, a beam of s-polarization light is projected from a light source. In this case, the B illuminating light component is transmitted through the dichroic mirror 3 as s-polarization light, so that a half wave plate 49 is located in front of input surface of the first PBS 4 thereby to rotate the plane of polarization of the B illuminating light through 90 degrees before feeding same to the first PBS 4. Another half wave plate 45 which is located in front of the input surface of the second PBS 6 in this case has characteristics of rotating the plane of polarization, not of the G illuminating light component but of the R illuminating light component through 90 degrees. In the optical system arrangement of FIG. 14, it is possible to switch the positions of B-LCD 7B and R-LCD 7R. In such a case, the system employs the same dichroic mirror and dichroic prism as in FIG. 12.

Figure 15:
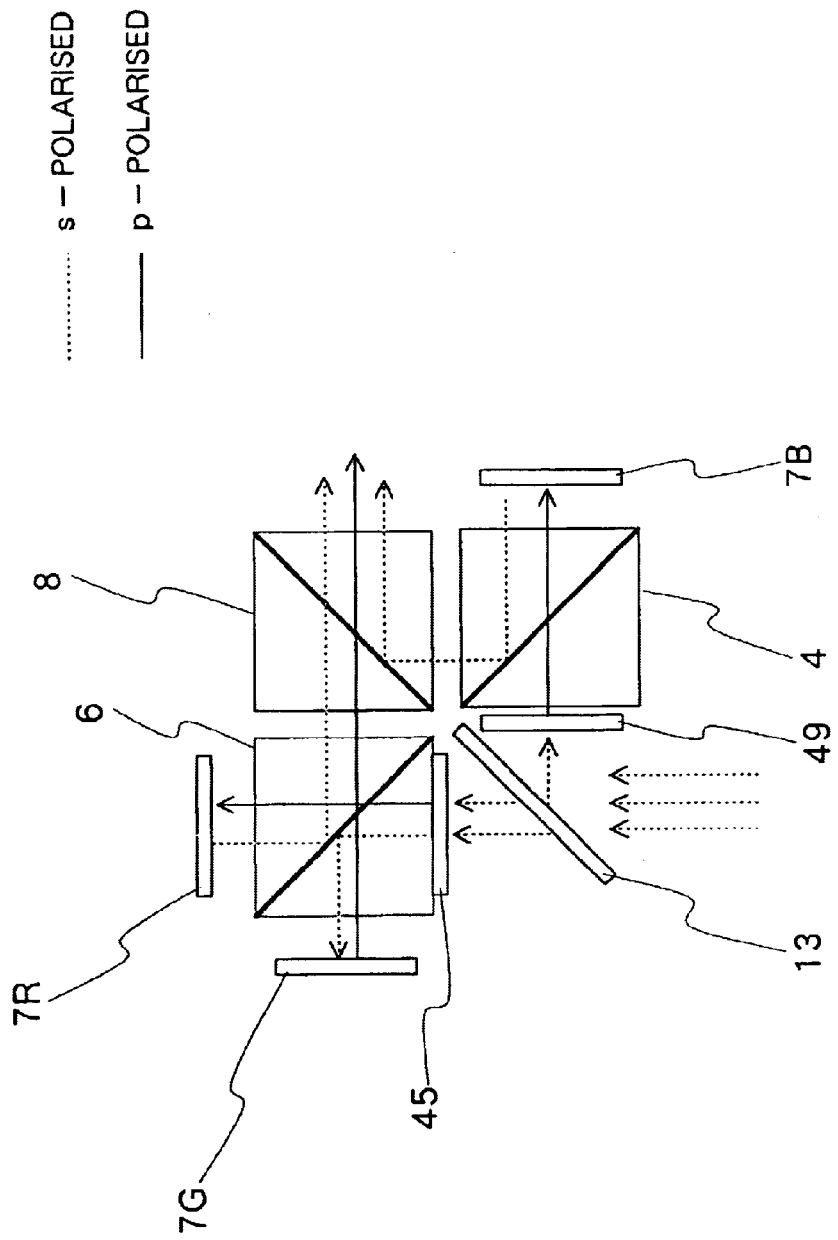
FIG. 15 is a schematic illustration of a sixth embodiment adopted by the reflection type liquid crystal projector according to the present invention.

In the case of an optical system shown in FIG. 15, the light source is adapted to project s-polarization light in the same manner as in FIG. 14. Dichroic mirror 53 is adapted to reflect the B illuminating light component while transmitting the G and R illuminating light components. That is to say, the dichroic mirror 53 is substantially of the same nature as the dichroic mirror 13 in FIG. 11. Similarly to the example shown in FIG. 14, half wave plates 49 and 45 are positioned in front of the input surfaces of the first and second PBSs 4 and 6, respectively. In the same way as in the above-described optical system of FIG. 14, it is also possible to switch the positions of B-LCD 7B and R-LCD 7R in the optical system arrangement of FIG. 15.

What is claimed is:

1. An optical system for a reflection type liquid crystal projector arranged to a split a beam of uniformly polarized white illuminating light, which is projected from a light source, into first, second and third wavelength components of three primary colors, to reflect said three wavelength components, respectively, by means of liquid crystal display panels to produce image light of the first, second and third wavelength components, and to synthesize the image light of said wavelength components together for projection as a full-color image, the optical system comprising:
a dichroic mirror adapted to separate a first wavelength component of said white illuminating light from second and third wavelength components;
a first polarizing beam splitter including a polarizing surface adapted to transmit or reflect said first wavelength component of said illuminating light toward a first liquid crystal display panel adapted to reflect image light of said first wavelength component;
a half-wave plate adapted to rotate a plane polarization of one of said second and third wavelength components through 90 degrees on passage therethrough, without rotating a plane of polarization of the other wavelength component;
a second polarizing beam splitter including a polarizing surface adapted to reflect or transmit said second wavelength component of the illuminating light from said half-wave plate toward a second liquid crystal display panel adapted to reflect image light of said second wavelength component, while transmitting or reflecting the third wavelength component of the illuminating light toward a third liquid crystal display panel adapted to reflect image light of said third wavelength component of the illuminating light; and
a dichroic prism adapted to synthesize the image light of the first to third wavelength components coming in from said first and second polarizing beam splitters;
wherein said polarizing surfaces of said first and second polarizing beam splitters are adapted to reflect s-polarization light and transmit p-polarization light; and
said dichroic prism is adapted to reflect the image light of said first wavelength component and to transmit the image light of said second and third wavelength components, said image light of said first and third wavelength components being s-polarization light and said image light of said second wavelength component being p-polarization light when transmitted or reflected by said dichroic prism.

2. An optical system for a reflection type liquid crystal projector as defined in claim 1, wherein said illuminating light beam from said light source is p-polarization light,
said dichroic mirror is adapted to transmit said first wavelength component and to reflect said second and third wavelength components of the illuminating light,
said polarizing surface of said first polarizing beam splitter is adapted to transmit said first wavelength component of the illuminating light toward said first liquid crystal display panel and to reflect said image light of said first wavelength component received from said first liquid crystal display panel,
said half-wave plate is adapted to direct said second and third wavelength components of the illuminating light toward said second polarizing beam splitter as s-polarization light and p-polarization light, respectively,
said polarizing surface of said second polarizing beam splitter is adapted to reflect said second wavelength component of s-polarization light toward said second liquid crystal display panel and to transmit said third wavelength component of p-polarization light toward said third liquid crystal panel, said second polarizing beam splitter is adapted to transmit said image light of said second wavelength component received from said second liquid crystal display panel and to reflect image light of said third wavelength component received from said third liquid crystal display panel.

3. An optical system for a reflection type liquid crystal projector as defined in claim 2, wherein said first, second and third wavelength components of the illuminating light are blue, green and red components, respectively.

4. An optical system for a reflection type liquid crystal projector as defined in claim 2, wherein said first, second and third wavelength components of the illuminating light are red, green and blue components, respectively.

5. An optical system for a reflection type liquid crystal projector as defined in claim 1, wherein said illuminating light beam from said light source is s-polarization light, said dichroic minor is adapted to transmit said first wavelength component and reflect said second and third wavelength components of the illuminating light, another half-wave plate is positioned in front of said first polarizing beam splitter thereby to convert the first wavelength component into p-polarization light, letting same pass through said first polarizing beam splitter toward said first liquid crystal display panel and reflecting the image light of the first wavelength component from said first liquid crystal display panel by said first polarizing beam splitter, said half-wave plate in front of said second polarizing beam splitter is adapted to direct said second and third wavelength component of the illuminating light toward said second polarizing beam splitter as s-polarization light and p-polarization light, respectively, and said polarizing surface of said second polarizing beam splitter is adapted to reflect wavelength component of s-polarization light toward said second liquid crystal display panel for reflection by the panel and transmit said third wavelength component of p-polarization light through toward said third liquid crystal display panel for reflection by the panel, then transmitting and reflectingimage light of said second and third wavelength components reflected from said second and third liquid crystal display panels, respectively.

6. An optical system for a reflection type liquid crystal projector as defined in claim 1, wherein said half-wave plate is provided as a film formed on a light incident surface of said second polarizing beam splitter.

7. An optical system for a reflection type liquid crystal projector as defined in claim 1, wherein optical elements of said first and second polarizing beam splitters and said dichroic prism are bonded together and integrated into a unitary optical structure in such a way as to eliminate boundary surfaces between said optical elements.

* * * * *